Patented May 14, 1940

2,200,709

UNITED STATES PATENT OFFICE 2,200,709

ORGANOGEL

Ernst Trommsdorff, Jugenheim-on-the-Bergstrasse, Germany, assignor to Röhm & Haas Company, Philadelphia, Pa.

No Drawing. Application March 12, 1937, Serial No. 130,544. In Germany March 19, 1936

8 Claims. (Cl. 260—32)

This invention relates to a process for preparing organogels particularly those in which the disperse phase is a relatively small fraction of the total. It relates further to organogels in which the gelling agent is a wholly or partially saponified polymeric substance.

Such gels have been made in the past for example by dissolving about five per cent. of potassium stearate in warm alcohol and cooling the solution. The lubricating greases prepared from petroleum oils and various soaps are further examples of this type of gel. Such gels, however, usually require relatively large amounts of the gelling agent, soap, and even then are not stable to heat because on moderate warming the soap dissolves in the oil and the system loses its gel character.

It is an object of the present invention to provide gels of this nature which require far less gelling agent and, moreover, can be heated to relatively high temperatures without losing their gel properties. It is a further object to provide a process for preparing the gels in a simple and economic manner.

These objects are accomplished by dissolving in an organic liquid a polymeric saponifiable material and saponifying it to such an extent that the saponified product assumes gel-forming character. In this condition the saponified material does not dissolve in the liquid but swells in it and forms a permanent gel.

The manner in which the proper characteristics are imparted to the gel-forming material varies somewhat and depends on the type of polymer used. These may be divided into four main classes (a) polymers prepared from single saponifiable substances such as the esters, nitriles, amides, etc., of acrylic and methacrylic acids, and joint polymers of two or more of these substances; (b) joint polymers of one of the foregoing materials with a polymerized unsaponifiable or difficultly saponifiable substances such as styrene or vinyl chloride; (c) joint polymers of two or more saponifiable substances one of which is a functional derivative of a polymerizable acid and the other an organic ester of a polymerizable alcohol such, for example, as a joint polymer of methyl acrylate and vinyl acetate; and (d) esters in which the alcohol radical forms the polymer such as vinyl esters and cellulose esters. In all these cases it is the polymerizable part of the molecule which determines its properties and therefore the specific unpolymerizable radical which is connected therewith is of minor importance. Thus equimolecular proportions of methyl acrylate and butyl acrylate when polymerized and saponified according to the present invention will have equal effects in gelling a given amount of an organic liquid in which they are soluble. The same is true of vinyl formate and vinyl butyrate for example. The unpolymerizable radical of the polymer, however, determines its solubility in various liquids. Thus the lower alkyl esters of acrylic and methacrylic acids are insoluble in petroleum fractions whereas the higher ones such as the octyl, decyl, lauryl, cetyl, etc., are soluble in these liquids. The same is true of the vinyl esters, those of the higher acids being more soluble in aliphatic hydrocarbons than those of the lower acids.

Examples of these various classes of polymers described above are:

(a) Polymers of the esters of acrylic and methacrylic acid such as the methyl, ethyl, butyl, etc., up to the cetyl and octadecyl, phenyl, benzyl, cyclohexyl, etc. The aliphatic esters may be derived from primary, secondary or tertiary alcohols having straight or branched chains. Polymers of the acid chlorides, amides, nitriles and anhydrides of these acids and joint polymers of any two or more of the foregoing compounds.

(b) Joint polymers of any of the compounds mentioned in Class a with an unsaponifiable polymerizable material such as styrene, vinyl ethers and vinyl ketones or difficultly saponifiable material such as vinyl chloride. Vinyl esters of organic acids such as the acetate, propionate, butyrate, laurate, palmitate, etc. may be used to replace all or part of the acrylic or methacrylic acid derivatives in joint polymers of this class. Joint polymers of this class contain not more than about 30% of the saponifiable constituent.

(c) Joint polymers of vinyl esters such as those mentioned in Class b with any of the acrylic or methacrylic acid derivatives mentioned in Class a.

(d) Polymeric material such as the above-mentioned vinyl esters and esters of cellulose such as the acetate, propionate, butyrate and mixed esters. For the purposes of this invention the cellulose esters behave in the same way as the other polymeric materials described and are therefore classed as polymers containing an unknown number of glucose units.

The method of treating the solution of the polymer to produce the best results varies according to the class in which the particular polymer falls. If a polymer of Classes a, c or d, described above, is completely saponified, the resulting product forms a temporary gel in which syneresis sets in after a short time and ultimately results in a complete separation of the liquid from the saponified polymer. The reasons for this are that the completely saponified polymer is insoluble in the liquid and that the liquid is unable to swell it. By saponifying only a portion of the available saponifiable groups of the polymer a product is obtained which, although insoluble in the liquid, will swell in it thus forming the gel. With polymers of this type it has been found that satisfactory gels may be obtained when as much as 25 to 30% of the available saponifiable groups have been saponified. The best gels and those of greatest durability are obtained when about 10% of the available saponifiable groups have been saponified. In this manner groups are generated within the polymer molecule which reduce its solubility but complete insolubility is avoided and tendency to swell is maintained at the same time by the original groups.

With the type of joint polymer described under (b) it is possible to prepare gels by completely saponifying the saponifiable groups. In order for the saponified product to retain its power of swelling in the organic liquid the saponifiable constituent should not amount to much over 30% of the total. In this manner it is possible to arrange joint polymers in which the saponifiable portion bears the same relation to the total molecule as do the saponified groups of the materials of Classes *a* and *d* discussed above. Thus in the finished gel the saponified portion of the polymeric or macro molecule is not over about 30% of the entire molecule, irrespective of whether all of the monomeric material from which the polymer is made is saponifiable or not. In using the polymers of Class *b* an excess of the saponifying agent may be used whereas with the polymers of Classes *a*, *c* and *d* an excess would render the saponified material completely insoluble in the liquid, thus destroying its gel-forming properties.

The organic liquids to which this invention is applicable are those which are solvents for the original polymeric material and which, although they are non-solvents for the saponified polymer, still have the ability to swell it sufficiently to form a firm, permanent gel. Such liquids are, for example, benzene, toluene, aliphatic hydrocarbons, methylene chloride, ethylene dichloride and other chlorinated aliphatic hydrocarbons, cycloaliphatic hydrocarbons, terpenes, etc. Those liquids which react with or dissolve the saponified polymer or which are attacked by the saponifying agent cannot be used. Alcohol and acetone, for example, tend to dissolve the saponified polymers completely and thus prevent the formation of the gel. Solvents that are easily saponified esters cannot be used but those which are more difficult to saponify than the polymer material can be. All of these liquids can be added in amount sufficient to destroy the gel-forming properties of the saponified polymer. Mixtures of various liquids can be used and these mixtures may also contain small proportions of those liquids which tend to dissolve the saponified polymer or otherwise destroy its gel-forming properties.

The organogels thus formed are remarkably stable even to relatively high temperatures and can be put to a variety of uses. They can be made up, for example, with liquids which act as paint removers and when applied to a vertical surface they have no tendency to flow down. On account of the extremely low content of gelling agent and the ease with which this may be removed from the cleaned surface, they are superior to paint removers which contain paraffin wax. Thus a perfectly clean surface is readily obtained by using such paint removers and there is no danger of any residue from the remover remaining on the surface to spoil subsequent coatings.

Gels may also be prepared in which the liquid used is easily combustible. They may be used as fuels in a manner similar to that in which "solidified alcohol" is used but they have the advantage over the latter that the gel does not melt.

The choice of the polymer will depend on the specific liquid in which the gel is to be prepared. Methylene chloride will dissolve practically all of the polymeric materials and therefore substantially all of them can be used to form gels with this liquid. The light petroleum distillates on the other hand are not solvents for the polymers of the lower alkyl esters of acrylic or methacrylic acids or of vinyl alcohol. For these liquids the higher esters are used, for example the hexyl or decyl esters of the two acids or the vinyl ester of a higher aliphatic acid. The choice of polymers is very wide and the best for any given liquid can be readily ascertained.

The amount of gelling material required is very small. In many cases as little as 0.5% based on the liquid will suffice but larger amounts can be used in which case, naturally, a firmer gel will be obtained. For the usual uses to which such gels will be put it will rarely be necessary to use more than 2% of the gelling agent although for special purposes higher amounts can be employed.

The following examples will illustrate the invention, which, however, is not limited to the exact materials and proportions given as it may otherwise be practiced within the scope of the appended claims.

*Example 1*

100 parts of 0.5% solution of polymeric ethyl acrylate in methylene chloride is treated with 0.5 part of an N/1 alcoholic sodium hydroxide solution. The originally thin liquid solution forms a durable solid gel after a few hours. In place of methylene chloride other liquids such as, for example, benzene may also be used. A solidified benzene prepared in this manner remained solid on warming. A block of it can be burned on a flat surface without any of the liquid benzol flowing away.

*Example 2*

0.75 part of methyl acrylate is dissolved in a mixture of

| | Parts |
|---|---|
| Naphthalene | 3 |
| Tetralene | 5 |
| Methylene chloride | 50 |
| Dipentene | 5 | and mixed with 1 part of N/1 sodium hydroxide in ethyl alcohol. After a short time the thin liquid mixture solidifies to a gel. This is then mixed in an emulsifying machine with 20 to 30 parts of another solvent such as ethyl acetate, acetone or methyl ethyl ketone until a viscous mixture containing small lumps of gel is obtained which on account of its consistency can be used as a paint remover. This material does not flow on vertical walls.

*Example 3*

A 1% solution of polymeric butyl acrylate in benzine is mixed with sufficient N/1 sodium hydroxide solution to saponify 20% of the ester groups present in the polymer. After several hours the mass has solidified.

Example 4

A joint polymer consisting of 70 parts of styrol and 30 parts of methyl acrylate is dissolved in benzine. A 1% solution in benzol may be solidified by mixing it with an alkali hydroxide solution. An excess of the alkali does not cause any separation of the liquid from the gel as is the case in the material shown in Example 1.

Example 5

In place of the joint polymer shown in Example 4 a joint polymer of 50 parts of vinyl acetate and 50 parts of ethyl methacrylate may be used.

Example 6

50 parts of a 2% cellulose tripropionate solution in methylene chloride is mixed with 50 parts of methylene chloride containing 0.75 part of N/1 alcoholic sodium hydroxide. A clear gel forms immediately on mixing.

In the foregoing examples sodium hydroxide has been shown as the saponifying agent. However, other saponifying agents such as potassium hydroxide and the alkali metal alcoholates may also be used. The amount of the saponifying agent will be determined by the strength of gel required and this will vary somewhat with the polymer employed and its concentration. The concentration of the solution of saponifying agent used is preferably low. It has been found that a normal alcoholic or aqueous solution gives very satisfactory results but no definite limits can be set and the invention does not depend on any definite range of concentration in the solution of saponifying agent which is added to the solution of the original polymer.

When the polymeric material saponifies readily as is the case with some of the cellulose esters, it is best to use a dilute solution of the saponifying agent and to add it slowly so as to insure uniform saponification throughout the entire solution. This prevents all of the saponifying agent being consumed by a relatively small portion of the polymer which would cause precipitation and thus defeat the purpose of the invention. In saponifying joint polymers of the type of Class 2, for example one made from methyl acrylate and vinyl acetate, it is often advantageous to use an alkali metal alcoholate as the saponifying agent as this forms polyvinyl ethers rather than polyvinyl alcohols and thus improves the gel-forming character of the saponified joint polymer.

In the claims the term "insoluble" means that the gel-forming material is not molecularly soluble in the liquid but is still of such nature that it will swell sufficiently in the liquid to form a more or less firm gel.

I claim:

1. The process which comprises dissolving a small amount of a polymeric organic compound containing saponifiable groups in an organic liquid in which the saponified polymer is insoluble and converting the entire solution to a gel by saponifying the polymeric material in said solution to such an extent that the saponified portion of the polymeric molecule does not exceed about 30% of the total molecule.

2. The process which comprises dissolving a small amount of a polymeric ester of methacrylic acid in an organic liquid in which the saponified polymer is insoluble and converting the entire solution to a gel by saponifying the polymeric material in said solution to such an extent that the saponified portion of the polymeric molecule does not exceed about 30% of the total molecule.

3. The process which comprises dissolving a small amount of a polymeric ester of acrylic acid in an organic liquid in which the saponified polymer is insoluble and converting the entire solution to a gel by saponifying the polymeric material in said solution to such an extent that the saponified portion of the polymeric molecule does not exceed about 30% of the total molecule.

4. The process which comprises dissolving about 0.5 to 3.0 parts of a polymeric organic compound containing saponifiable groups in 100 parts of an organic liquid in which the saponified polymer is insoluble and converting the entire solution to a gel by saponifying the polymeric material in said solution to such an extent that the saponified portion of the polymeric molecule does not exceed about 30% of the total molecule.

5. The process which comprises dissolving about 0.5 to 3.0 parts of a polymeric organic compound containing saponifiable groups in 100 parts of an organic liquid in which the saponified polymer is insoluble and converting the entire solution to a gel by saponifying the polymeric material in said solution to such an extent that the saponified portion of the polymeric molecule constitutes about 10% of the total molecule.

6. The process which comprises dissolving a small amount of a joint polymer of polymerizable organic compound containing saponifiable groups and a polymerizable organic compound free of such groups in an organic liquid in which the saponified polymer is insoluble and converting the entire solution to a gel by saponifying the polymeric material in said solution to such an extent that the saponified portion of the polymeric molecule does not exceed about 30% of the total molecule.

7. The process which comprises dissolving a small amount of a joint polymer of polymerizable organic compound containing saponifiable groups and a polymerizable organic compound free of such groups in an organic liquid in which the saponified polymer is insoluble, said joint polymer containing not over 30% of the saponifiable constituent, and converting the entire solution to a gel by saponifying the polymeric material in said solution.

8. The process which comprises dissolving about 0.5 to 3.0 parts of a joint polymer of styrene and an ester of methacrylic acid containing not over 30% of the ester, in an organic liquid in which the saponified polymer is insoluble and converting the entire solution to a gel by saponifying the saponifiable groups of the joint polymer in said solution.

ERNST TROMMSDORFF.

CERTIFICATE OF CORRECTION.

Patent No. 2,200,709.  May 14, 1940.

ERNST TROMMSDORFF.

It is hereby certified that error appears in the printed specification of the above numbered patent requiring correction as follows: Page 3, second column, line 61, claim 8, for "methacrylic" read --acrylic--; and that the said Letters Patent should be read with this correction therein that the same may conform to the record of the case in the Patent Office.

Signed and sealed this 25th day of June, A. D. 1940.

(Seal)

Henry Van Arsdale,
Acting Commissioner of Patents.